United States Patent [19]
Armstrong

[11] 3,853,764
[45] *Dec. 10, 1974

[54] WASTE WATER TREATMENT SYSTEM

[76] Inventor: Edward T. Armstrong, 490 Pepperidge Tree Ter., Butler, N.J. 07405

[ * ] Notice: The portion of the term of this patent subsequent to May 1, 1990, has been disclaimed.

[22] Filed: Apr. 30, 1973

[21] Appl. No.: 355,738

Related U.S. Application Data

[63] Continuation-in-part of Ser. No. 100,333, Dec. 21, 1970, Pat. No. 3,730,881, which is a continuation-in-part of Ser. No. 362,118, April 23, 1964, abandoned.

[52] U.S. Cl. ............... 210/195, 210/202, 210/203, 210/220, 210/519, 210/199
[51] Int. Cl. ............................................. C02c 1/08
[58] Field of Search ..................... 210/2–8, 14–18, 210/63, 96, 150, 151, 195, 197, 199, 202, 203, 220, 519

[56] References Cited
UNITED STATES PATENTS

| | | | |
|---|---|---|---|
| 2,809,933 | 10/1957 | Havorson | 210/150 X |
| 3,123,556 | 3/1964 | Gilbert | 210/151 |
| 3,140,259 | 7/1964 | Kelly | 210/195 |
| 3,275,147 | 9/1966 | Gilde | 210/150 |
| 3,296,122 | 1/1967 | Karassik et al. | 210/2 |
| 3,477,947 | 11/1969 | Kappe | 210/3 |
| 3,485,749 | 12/1969 | Reilly | 210/7 |
| 3,589,518 | 6/1971 | Brebion | 210/150 |
| 3,617,537 | 11/1971 | Vermette | 210/8 |
| 3,730,881 | 5/1973 | Armstrong | 210/220 X |

Primary Examiner—Samih N. Zaharna
Assistant Examiner—Robert H. Spitzer
Attorney, Agent, or Firm—Oldham & Oldham Co.

[57] ABSTRACT

The invention represents a new concept in liquid processing particularly in sewage treatment utilizing air, oxygen or a carrier fluid with some liquid or gas disinfectant as an attenuator or anaerobic biota, for generalized disinfection, for aeration, or for oxygenation. Essentially, unique designs and/or processes are incorporated into the conventional settling tanks associated with sewage treatment, as well as in the bioprocesses, activated sludge or trickling filter operations. The structural improvements in settling reduce velocity, inhibit boundary layer separation and act to suppress mixing of the sewage to greatly enhance solid and fluid separation, while the bioprocessing operations, the key is to improve efficiency of the liquid-gas exchange whereby much better oxygen contact is achieved. The liquid-gas exchange feature utilizes a high momentum exchange under turbulent flow conditions in a hydraulic pressure gradient to achieve intimate mixing of the desired gas in the fluid so as to achieve the desired very reliably and efficient liquid-gas exchange.

46 Claims, 14 Drawing Figures

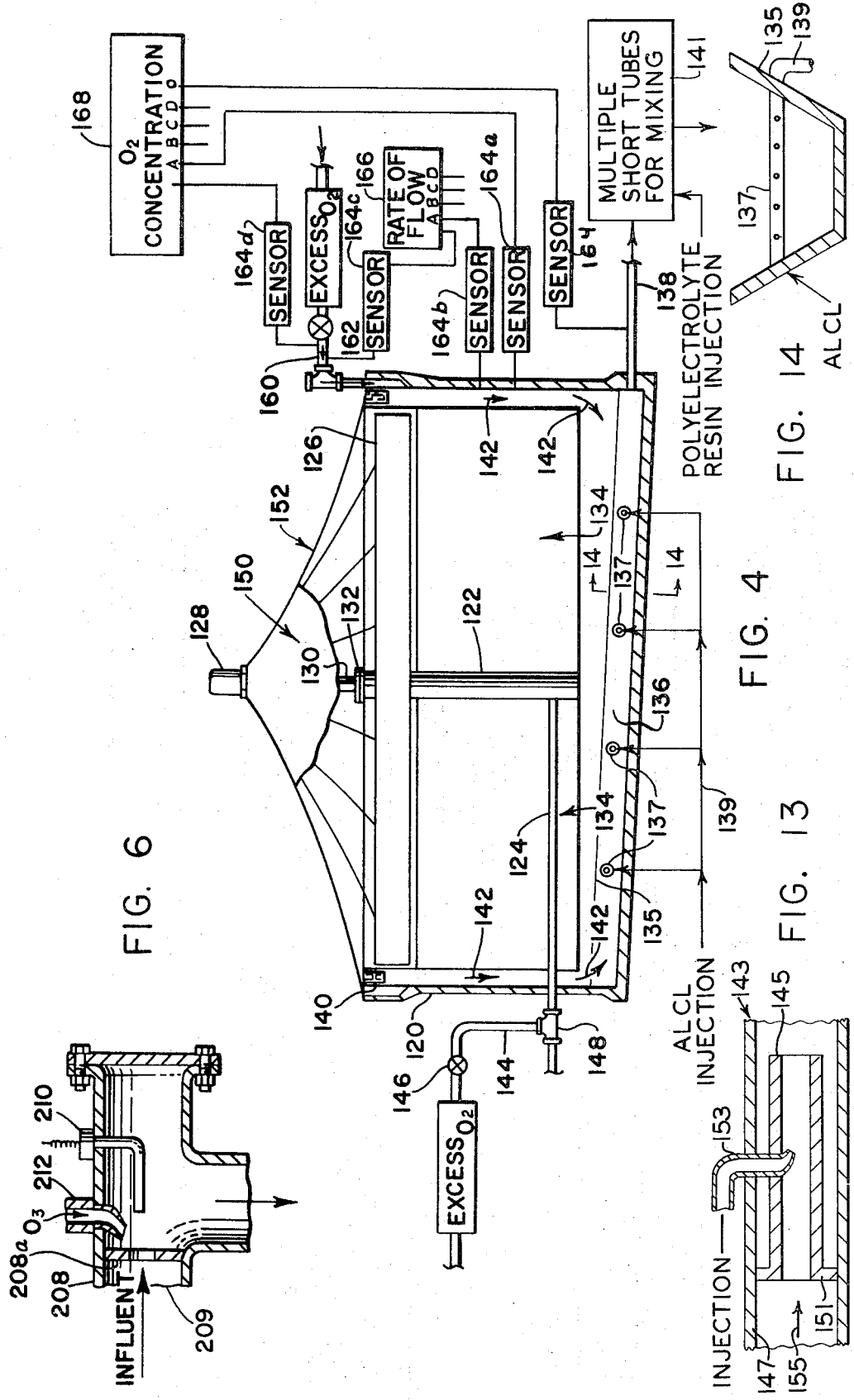

WASTE WATER TREATMENT SYSTEM

This application is a continuation-in-part of my earlier application Ser. No. 100,333 filed Dec. 21, 1970, now U.S. Pat. No. 3,730,881, which is a continuation-in-part of application Ser. No. 362,118 filed Apr. 23, 1954 and now abandoned.

Presently, Federal and State legislation focus intensified attention on the need for a reversal in the trend towards complete degradation of the water supply resources of the United States. A concurrent tight supply of funds highlights need for economy. The concensus of specialists in the fields of sanitary engineering and public health appears to be that the existing criteria and acceptable minimum requirements for effluent quality bear heavily on the present state of the art in the sanitation systems. So severe is the pressure that it would seem to require a breakthrough in technology in contrast with mere improvements in present techniques. This invention shows how the present art and practive can be upgraded to satisfy needs with what may or may not truly be termed a breakthrough.

The foregoing background information explicitly indicates the nature of the water pollution suppression problem. The general object of the invention is to achieve a marked advance in sanitary engineering practices such that current and anticipated future minimal pollution criteria may be exceeded. The specific objects of the invention are to provide a sanitation system that is technically and economically feasible, adaptable to existing equipment and facilities, and in compliance with conservation policies and effluent quality criteria.

A further object of the invention is to provide a sanitation system which utilizes gases such as air, oxygen, ozone, of chlorine under new concepts of liquid-gas exchange to be competitive with current equipment, materials and systems, and yet much more effective.

A further object of the invention is to provide a novel concept in settling tank and bioprocessing technology for independent application or application in conjunction with a novel liquid-gas exchange technique applied in disinfection.

A further object of the invention is to incorporate a balanced system concept into bioprocessing technology to make the most efficient use of the equipment under optimum operating conditions.

For a better understanding of the invention reference should be had to the accompanying drawings wherein:

FIG. 4 is a cross-sectional, schematic view of an improved trickling filter comprising a stage of the system of the invention;

FIG. 6 is an enlarged cross-sectional view of one of the flat plate orifices associated with the disinfection unit of FIG. 5 indicating the gas input and sting relationship to the orifice to obtain maximum efficiency in the introduction of the disinfecting gas and the elimination of concentration gradients;

FIG. 13 is an enlarged cross-sectional illustration of a short tube with injector to achieve good liquid, liquid, or gas-liquid mixing characteristics; and FIG. 14 is a cross-sectional illustration of the trough which traverses the floor of the trickling filter showing how a suitable sedimentation agent may be inserted into the fluid flowing therein.

Figure 1:
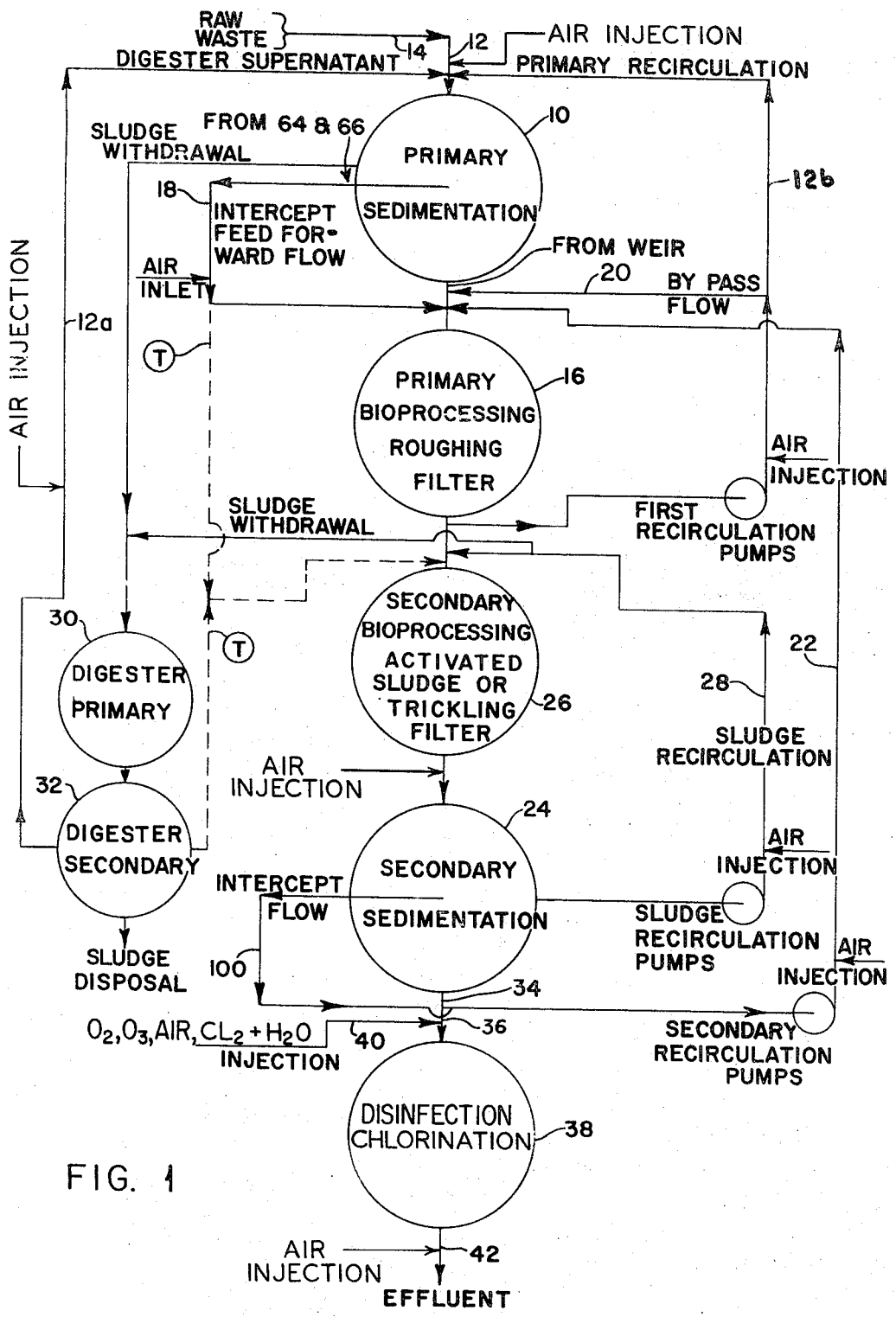
FIG. 1 is a block diagram, schematic illustration of the newly proposed system in total showing flow arrangements and the stages involved.

DEFINITION OF TERMS PSEUDOMONAS, ALCALIGENES, FLAVOBACTERIUM, MICROCOCCUS AND ENTEROBACTERIACEAE

ACTIVATED SLUDGE

All types of bacteria make up activated sludge, however, in usual operation obligate anaerobes will attenuate in number in response to the presence of air. A proteinaceous waste will favor alcaligenes, flavo bacterium and bacillus. A carbohydrate waste will proliferate pseudomonas as well.

ANAEROBIC DIGESTERS

The anerobic digester bacteria include facultative and obligate anaerobes in active metabolism. Dormant aerobic forms may be present, such as spores of fungi. Acid formers are predominantly facultative forms although a few obligate anaerobes have metabolic end products which are acid.

Methane formers are obligate anaerobes, methanobacterium, methanosarcma and methanococcus in the metabolic pathway to subsequent end products where methane is a precursor, the pathway can be intersected owing to the implied vulnerability of methane formers to oxygen, oxygen-ozone or air. Thus, selective disinfection provides a means to inhibit methane formation or to deny a metabolic pathway to succeeding end products where methane is the necessary precursor. With denial of a pathway, an alternative pathway may be stimulated by changing environmental conditions such as an aerobic activity. In this way methane would not be formed. The source material, carbon dioxide would not be reduced. This is an unnecessary step in waste treatment, since carbon dioxide is a stable end product of aerobic treatment. The hydrogen involved would not be acted upon. It is probably a constituent of formic or acetic acid. Thus, the alternative metabolic pathway opened is that for aerobic microbiological decomposition of acetic acid. Instead of the anaerobic sequence acetic acid, acetoacetic acid to acetone acid isopropanol or to butyric acid and butanol, this invention develops the aerobic sequence. It is: acetic acid, possible pyruvic acid, oxalacetate, citrate and the citric acid (Krebs) cycle to terminal oxidation.

In a similar way, the anaerobic reduction of sulfates by the obligate anaerobic, desulfovibrio can be inhibited. Shifting to an aerobic environment denies a pathway to hydrogen sulfide. It has been found that this is readily achieved practically by aeration. Consequences include a marked reduction in objectionable odor and long persistence of aerobic action. The latter case is demonstrable by unexpectedly deferred methylene blue stability tests including a shift to products of anaerobic metabolism.

MICROORGANISMS IN WASTE TREATMENT

Trickling Filter

Filter microorganisms reflect the facultative nature of the filter. Predominant are bacteria; aerobic, facultative and anaerobic. Obligate aerobic spore formers bacillus are easily found in the upper, aerobic plaques. The obligate anaerobe, desulfovibrio can be found in lower levels at the plaque-stone interface, where, in usual practice, DO is zero. The majority of bacteria are facultative, living aerobically until DO zeros, then anaerobically.

With reference to the drawings, FIG. 1 illustrates the waste treatment equipment, process and overall system of unit operations in which the invention operates. A primary sedimentation tank is indicated by numeral 10. The tank 10 receives comminuted raw waste including settleable solids from a line 12 issuing from a main line 14. A multiplicity of such lines 12 and subsequent operations may exist.

Two other flows are introduced from the operations which follow, constituting feedback of digester supernatant line 12a and of primary recirculation line 12b. The supernatant fraction is waste having high organic loading, relatively low flow, and it is resistant to aerobic processing for two reasons. First, it presents a biotal population adapted to anaerobic digestion and second, its organic composition includes the products of anaerobic metabolism.

The second fraction of flow is the primary recirculation usually occurring at rates in the range of one half to three times the raw waste rate. This recirculation flow is charactrized by low organic loading and a high degree of treatability in an aerobic process. It exerts dilution effects on the raw waste which are not only marked, but which may be used in conjunction with secondary recirculation to great advantage in smoothing hydraulic and organic loading, as discussed later.

These three flows are impressed upon primary sedimentation. Regulatory authorities often stipulate hydraulic design criteria for sedimentation equipment in terms of the tank overflow rate which prevails for the composite flow. Such overflow rates may be affected by the technique illustrated in FIG. 1 of intercepting a portion of flow to be fed forward to bioprocessing indicated at numeral 16. As discussed later, in settling, using feed forward techniques, additional benefits accrue for example in organic load smoothing.

The basic flow from primary sedimentation 10 proceeds to a primary stage of bioprocessing 16. A roughing trickling filter is illustrative. There, to the sedimented basic flow, three component flows may be added. One 18 is the feed forward intercept flow noted previously. The second 20 is the bypassing fraction of primary recirculation. The third 22 is the secondary recirculation shown in FIG. 1. The existence of the feedback flows, the feedforward flow and the basic influent flow prior to bioprocessing is important. This combination provides sufficient degress of freedom to enable independent regulation in this and succeeding operations of hydraulic and organic loading with some flexibility and without overloading primary sedimentation. From the bioprocessing operation 16, such as the roughing filter shown, in most cases, existing plant flow proceeds to secondary sedimentation 24. In some instances, a second stage of bioprocessing 26 may be present. Usually this would be a finishing trickling filter. Rarely, but preferably, it would be an activated sludge stage of bioprocessing.

In this instance, as shown in FIG. 1, from the first stage of bioprocessing 16, the flow is split, with primary recirculation over line 12b withdrawing a fraction for feedback to an earlier stage of processing 10. The remaining fraction proceeds to the second stage of bioprocessing 26. Before introduction to bioprocessing 26, such as to the activated sludge operation, it may be mixed with recirculating activated sludge from line 28.

A remaining portion of the recirculating activated sludge is discharged for digestion with the primary sedimentation tank sludge in a primary digester 30 and secondary digester 32.

From the activated sludge operation 26, the flow proceeds to secondary sedimentation 24. The regulatory authorities stipulation on overflow rate again prevails; however, the permissible overflow rate for secondaries 24 may differ for those from primaries and may further depend upon the type of bioprocessing operation involved. The activated sludge operation is characterized by highrates of recirculation over line 22 of sedimented sludge as suggested in FIG. 1.

From the secondary sedimentation operation 24, flow may be intercepted for feedback recirculation over line 22 after partial sedimentation. A second fraction of fully sedimented flow may be returned in the basic secondary recirculation by line 34. The remaining fully sedimented flow proceeds to disinfection over line 36. In the disinfection unit 38 operation, in-line gas-liquid disinfection over line 40 by injection may precede the conventional contact chamber disinfection. The technique of gas injection is more fully defined hereinafter. The same, or complementary disinfectants may be used. For example, in-line ozonation might be followed by contact chamber chlorination in unit 38. Alternatively, chlorination may occur in both stages or only in the contact chamber with no in-line disinfection. Disinfection yields the final effluent over line 42.

It has been shown in FIG. 1 that sludge is removed from waste at successive stages of waste treatment. The sludge is stabilized, usually in two-stage anaerobic digesters 30 and 32. From the digester 32, stabilized sludge may be discharged to drying on beds, in a kiln, fluidized bed reactor or on a vacuum dewatering drum. Ultimate disposition of solids products may be land fill or incineration. Disposition of digester supernatant over line 12a has been noted previously. It is this overall framework of unit operations within which the concepts proposed by the invention must be implemented. Discussion will now proceed in terms of each of the unit operations described. A final section will deal with optimum systems integration.

It should be noted however that aeration or other injections may take place at a considerable number of other points into the effluent in the system of FIG. 1. Specifically air may be injected into the digester supernatant recirculation, the raw waste input, the effluent from disinfection tank 38 and to the effluent from the secondary bioprocessing tank 26. In some instances it is desirable to inject a chlorine water solution into the effluent before disinfection to obtain break point chlorination. It should further be understood, of course, that chlorination may be used in the disinfection tank 38.

SETTLING

Settling or sedimentation is a standard unit operation in waste treatment. The effectiveness of this operation is essential because of the high concentration and broad size range of the particles present in sewage. The concentration of these particles falls in size characteristic from a diameter of 0.000001 to 5.0 millimeters. This is an important characteristic, since it affects the settling velocities upon which sedimentation or clarification depend. The significant velocities range upwards from a lower limit of $19^{-9}$ millimeters per second. These velocities are achieved in clarification or settling in sewage treatment and are of primary interest owing to their broad range and extremely low magnitude.

The importance of this from a practical standpoint is in the degree of momentum exchange, vorticity, or of turbulence which will degrade settling or clarification processes. Obviously, it is any level of velocity which approaches the settling velocities described. The significant implication of this, of course, is in the fact that the kinetic energy which is present at the influent to the sedimentation chamber should be reduced to the lowest possible practical level. Anything which tends to increase the kinetic energy of the influent jet will upgrade the performance of the clarification of sedimentation process. Recirculation has such effects, however, it has offsetting compensatory advantages in diluting the organic load to be handled. In contrast, high velocity, or excessive momentum exchange impose a penalty without an offsetting advantage.

Figure 2:
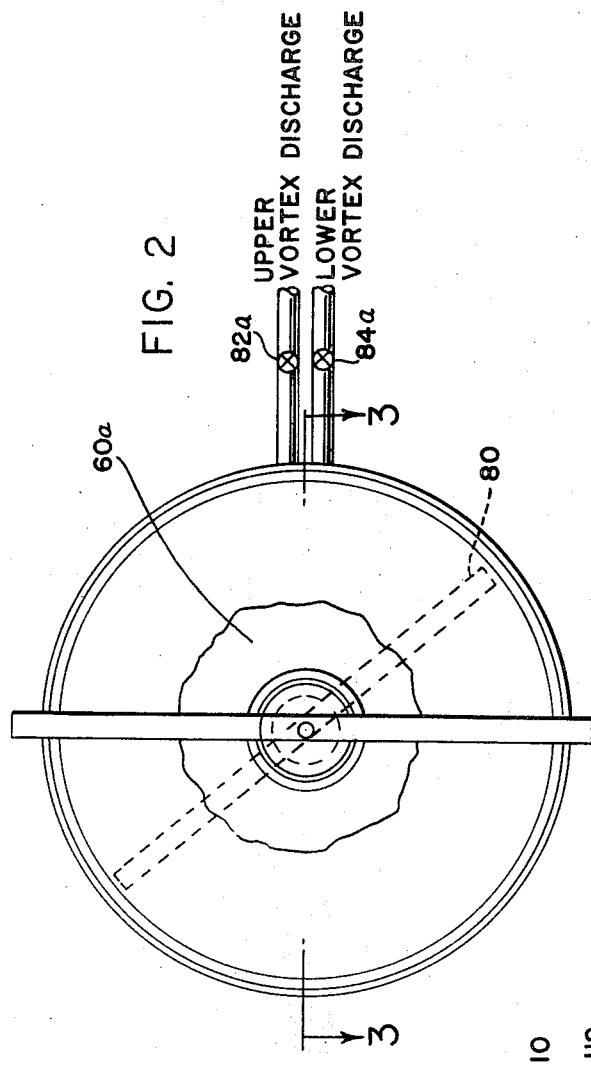
FIG. 2 is a plan view of an improved settling tank comprising one of the stages in the system.
Figure 3:
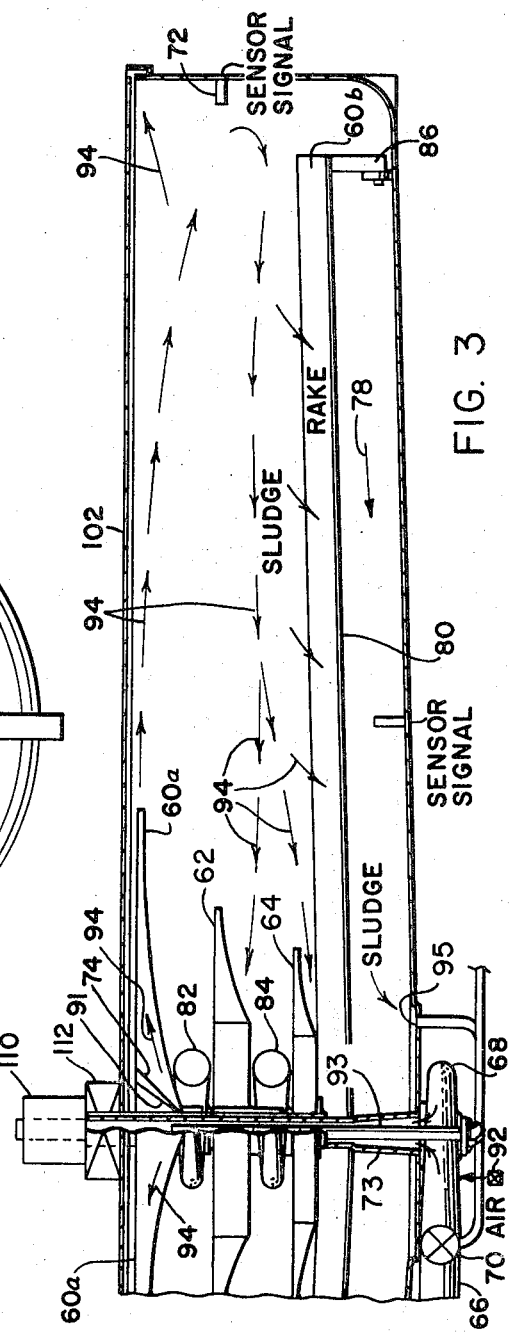
FIG. 3 is a cross-sectional view of the settling tank of FIG. 2 taken on line 3—3 thereof.

For an understanding of the basic construction of the settling tanks 10 and 24, reference should be had to FIGS. 2 and 3 of the drawings. The specific effects of the modifications of the settling chamber are as follows:

a. To control the fluid path prior to free settling.
  b. To reduce the velocity and turbulence level at the influent to the region of free settling.
  c. To increase the settling flow path length and the time availabe for settling.
  d. To increase the functional effectiveness of settling.

e. To reduce, the forward-feed techniques, the hydraulic load on the settling tank and particularly to reduce its overflow rate.
  f. To introduce a further degree of freedom in hydraulic and organic load existing in present feed-back recirculation.

The apparatus making up the improved settling tank of the invention may be fitted in a conventional circular settling tank. Its distinguishing element is a rotationally-transformed radial or hyperboloidal-envelope diffuser. The diffuser may incorporate spiral vanes indicated generally by numeral 60a. The rotational transformation is through 7° or less to ensure minimum probability of flow separation at the channel boundary. This is a critical factor in the three-dimensional diffuser design owing to the flow deceleration which is induced.

Smaller, but similar, three-dimensional spiral-shaped collectors 62 and 64 are used at one or more centrally located annular collection points to provide upper effluent collection and/or intermediate effluent collection, respectively. There, flow is accelerating and boundary layer separation is much less significant.

In a conventional tank, influent and effluent flow may be distinguished. Previously and in existing art, these have not been considered in terms of optimum overall circulation. The case is illustrated by the conventional circular plan view sedimentation tank. In it, flow is usually upward in a central influent well. At the upper limit of this central well, flow is predominantly radially outward with both relatively high turbulence and velocity.

In such a tank, the predominantly radially directed surface jet includes a circulation in the central region. In consequence, a sustained toroidal vortex circulation develops there. This means that the intended settling flow is perturbed. It is degraded functionally by rotational mixing usually impored mechanically and gravitationally by earth rotation. The result is settling circulation.

Concurrently, the outflow is predominantly a peripheral, radial flow. It induces a similar toroidal vortex at the overflow weir. This toroid exhibits comparably lower velocities, lower turbulence and a much larger diameter. This circulation is of lower energy level corresponding to the reduced overflow velocity. The direction, or sense of rotation, in the second toroidal vortex is the same as in the influent circulation. This means that at an intermediate radial position in the tank, the two toroidal vortices interact with opposing local vertical components of flow. This interaction manifests itself by momentum exchange which degrades settling.

To attempt sedimentation under imposed conditions antagonistic to the functional objective seems ill advised. A desirable situation is to recognize that an overall circulation must be considered and that the direct and induced flow described must be complementary to the necessary circulation. This is the general objective of the settling tank of the invention.

This is possible under the case for circular plan view sedimentation if a single toroidal vortex may be induced under controlled conditions of overall circulation. Preferably, this should be done in such a way as to enhance the primary sedimentation flow and, if necessary, to yield a secondary effluent having predictable sedimentation.

This may be accomplished by insertion and use of the central collection 62 described, positioned beneath the central influent jet 82. Its flow is radially inward below the influent jet boundary surface. Owing to the presence of an hyperboloidal diffuser surface or vane 60a, the central effluent can operate with minimum degradation of the influent jet. Moreover, it operates upon a well-sedimented, low turbulence fraction of sedimentation tank contents. These conditions lend themselves to the production of a consistent, predictable fraction of partially sedimented flow which reduces the tank overflow rate.

On the inlet to the intermediate level collector in the sedimentation tanks it may have the hyperboloidal profile of the upper diffuser vane 60a and that it is less critical in that flow is accelerating. On the system optimization, more fully explained hereinafter, it appears that it is essential to control the process, operated manually or automatically to accomplish the desired flows stated above. Representative means 70 for manual or automatic regulation are provided. Implementation of sensors 72 for flow are an obvious requirement. One way to determine organic load is to measure it by lab techniques on typical days. The average hourly results could be charted. Control of means 70 could be based on the expectation that this would occur. It is also possible to use inferential measurements of load, such as those based on light transmission or spectral absorption in narrow bands of wave length. Probably rapid, intense oxidation could be accelerated sufficiently to give real time data on BOD.

Then, system control for manual or for automatic conditions may be based on an expected program (historical findings) modified by real time measurements of the actual hydraulic and organic loading conditions with sensors 72, for example. This is a standard control technique in any servo system. The essential feature is to program, establish errors, impose an error correction and instrument the result to make sure the error was corrected. If not, a secondary correction may be introduced.

FLOTATION SEPARATION

This concept may be introduced with a secondary functional effect of the central influent well 90. The affect is applicable where flotation, particularly for oil and grease separation is of concern. These conditions occur in primary sedimentation. To accomplish this result, presaturation of the influent with air as through injector 92 at pressure levels exceeding that at discharge is desirable. Outgassing of the excess air as the system is depressurized enables enhanced flotation in the influent well 90 of the primary sedimentation tank. This integrates equipment and methods of sedimentation improvement with those of gas-liquid mixing, both as set forth in the present invention.

The collectors 62 and 64 remove two cuts of flow from the settling tank and from the sedimentation effluent discharges from the overflow weir central collectors. The upper cut is taken from 6 inches to 30 inches below the liquid line which normally runs closely adjacent the top edge of the tank. The lower cut is taken from 36 to 48 inches below such liquid line. The major portion of the intercepted flow amounting to approximately 2/3 the total is taken from the upper effluent collector 62. The lower collector 64 removes the remaining flow except for sludge and its entrained liquid. Normally, it will be necessary for the effluent picked up by collector 64 to pass to another processing operation for further treatment. From the sedimentation operation, the basic flow sheet leads to bioprocessing. The effluent flow in the sedimentation tank is indicated by the arrows 94. The effluent enters line 66 through valve 70, up the influent well 90, driven by pump 68, and discharged from the top 91 of well 90, through screen 74 and into a spiral discharge by vanes 60a adjacent the top surface of the effluent level. The diffusers vanes 60a are driven in a slow rotary motion by motor 110 which is supported on a bridge truss 112 which extends over the top of the tank. The motor 110 is of variable speed and appropriately driven for the correct latitude of the tank since the vortex for the effluent actually depends on latitude.

Flow is controlled by valves 82a and 84a, as best seen in FIG. 2 of the drawings, and at the inlet by valve 70. The effect of the valves in inducing turbulence at the diffuser effluent is suppressed by means of the hole size in the screens 73 and 74. It should be understood, however, that similar operations occur at greatly reduced velocities in tank 24 which might cause the elimination of an upper effluent collector 64.

At the end of the vanes of diffuser 60a, the effluent is directed in close to a tangential direction in the horizontal plane. The vertical component of velocity is extremely low owing to deceleration in the diffuser. In view of the low velocity, it is clear that sedimentation will occur in the diffuser. Provision is made for continuous sludge removal. This is done by operating the diffuser at close to zero buoyancy, a mechanical technique readily within the skill of one in the art.

The diffuser vane 60a is rotated at a very slow speed, perhaps one revolution per hour. These serve as collectors of finely classified material. The sludge is removed through pipe 93 in the central section and out through the tank bottom, as well as through a sludge trough 95 and sludge conduit (not shown).

It has been anticipated that the extreme care taken in settling tank design may be upset by two factors. One is wind induced surface cooling and superimposed horizontal flow. The second is the density analomy in water which occurs at 4°C. The latter factor may have severe consequences in terms of vertical circulation. In addition, there is the usual effect of temperature variation on the density of water. For these reasons, the invention uses an air enclosure over the tank, as indicated by cover 102. This cover 102 mitigates the effects of wind and temperature.

At least one of the central effluent volutes 82 or 84 will be vertically adjustable, and probably both, so as to ensure positioning thereof in accordance with the flow demands through the tank to achieve optimum performance.

To ensure light gravitational loading, the rotating diffuser 80 will be supported peripherally at each sector by wheel 86 running at fixed load on the bottom. The wheel load control may be set with a suitable type of spring loaded washers.

The secondary settling tank 26 receives effluent from the lower cut of the first tank 10. Its primary sedimentation in its diffuser will pass particulates of 200 mesh or finer into the tank proper. The described cut for particulates greater in size than those passing a 200 mesh screen will be deposited and removed from the sedimentation which occurs in the diffuser 80 beneath the false bottom, as in the flow path 78.

In regard to flow, in the secondary settling tank 26, the hydraulic effluent is one-third the plant effluent. The tank proper is intended to separate, in two cuts, the coarsest effluent particles to those of less than 200 mesh. In the upper cut of sedimented flow, two-thirds the effluent is removed. The lower cut of flow removes one-third the tank effluent, or about one-ninth of the initially impressed hydraulic load on the plant. Only this fraction of flow proceeds to the trickling filter or other BOD reduction process.

ROUGHING TRICKLING FILTER

The following discussion will involve the operation of the first bioprocessing stage, a roughing filter 36 commonly known as a trickling filter. No discussion will be given to the aeration stage 34 impressed upon the influent, as this is covered in my copending applications. Bioprocessing operations are responsible for the principal reduction in BOD. The elementary theory of a trickling filter is that an extended surface is provided usually using rock fill, about 6 feet deep, on which a microbial plaque develops under pulsed film flow of waste liquor containing some dissolved oxygen, DO. The plaque is comprised of a surface-containing anaerobic substrate immediately adjacent to which anaerobic and facultative microbiological forms predominate. Above this layer, aerobic forms may be present. This implies a source of oxygen. Ostensible this is provided by an induced, vertical, natural-convective air circulation occurring parallel or countercurrent to the pulsed liquid flow.

A fundamental limitation of conventional trickling filteration is the indifferent oxygenation occurring therein. In consequence, aerobic processes essential to bioprocessing are inhibited. Diminished capacity in organic load reduction results. A further limitation aggravates this probelm. It arises since, to allow some air circulation, hydraulic loading is restricted. This reduces the capacity of the filter and concurrently the effectiveness of waste treatment. This is so because the hydraulic compromise restricts flow recirculation to the filter, a prime factor in deriving significant BOD reduction.

To indicate the deficiencies of free convective air flow in trickling filters, it is of interest to refer to operating conditions inducing such flow. A basic equation for air velocity as taken from *Waste Water & Waste Water Engineering*, Fair, et al., John Wiley & Sons, Vol 2, pp 35–13, is:

$$Va = 0.135 \Delta T - 0.46$$

where $Va$ is the air velocity in feet per minute and, $\Delta T$ is the temperature difference between the air and the waste water, °F.

The waste water-air temperature difference seldom exceeds 25°F. For temperature differences of 10°, 3.4°, and −3.3°F, for example, Va is respectively +1.0, 0 and −1.0 fpm. The positive sign denotes downward flow. Recognizing the filter is a stone-packed bed about 6 feet deep. In no case is a realistic air velocity indicated. Forced air circulation has been examined with little promise. Packed bed resistance to air flow can be high especially with superimposed hydraulic flows.

The limitations of aeration and compromises in hydraulic loading are unnecessary. The ideal remedy is use of an effective air-liquid mixing system in the trickling filter influent line. This will provide DO in the range of 7 to 8 ppm, all year round and at any hydraulic loading. The particularly undesirable restriction of recirculation may be relaxed. This simple remedy will enable hydraulic loading in the range from 1,000 to 3,000 or more gallons per square foot per day. Typical current practice is at about one-fifth these levels. The hydraulic flows are restricted to these levels to defer blocking of air flow which has been necessary to provide for aeration. Having eliminated compromises dictated by inadequacies of aeration in conventional art a simple change enables full exploitation of the revised trickling filter process. This change is one of media, from a size range of coarse rock to a reduced size range of smaller media. The change in media is primarily responsive to hydrodynamic flow. This is so because compromises relating to one flow are unnecessary. Inasmuch as the change is in hydrodynamic characteristics, it is conventional to describe the desired media properties in terms of hydrodynamic parameters.

The parameters of interest are the friction factor, the Reynolds number and the roughness coefficient. The media size factor applys as an equivalent diameter. The characteristic length of flow path is the bed depth, which is conventional. The relation among these factors if of the form:

$$f = a/N_R + b$$

where $f$ is of the friction factor $a$ is of a constant $N_R$ is the Reynolds number and $b$ is the bed media roughness factor.

The defining equations of interest are:

$$f = 2g\ De\ \Delta P/\tau V^2,$$

and $$N_R = De\ V\rho/\mu$$

It sufficies to define the media in terms of its equivalent diameter and roughness factor. Flow conditions are stipulated by the functional relationship between friction factor and Reynolds number.

The typical parameters for new media are in the range tabulated next for a hydrodynamic or hydrofoil element. This arises in relation to an influent waste with high DO and no aeration required in the filter proper.

I have calculated for a substitute plastic media, for example PVC. The media is extruded tubing. It is assembledd in an equilateral triangular grid to maximize the surface installed per unit volume.

The tubes are spaced to ensure balanced flow inside the vertically positioned tubes and outside the tubes. This requires that the hydraulic radius for the internal and external passage be equal.

Figure 12:
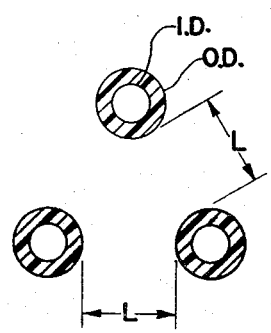
FIG. 12 is a cross-sectional end illustration of the tubular media which can be used in the trickling filter.

A typical result appears as follows as is illustrated in FIG. 12

OD = 0.84 inch

ID = 0.74 inch

L = Grid spacing 1.16 inch

The hydraulic radius of a channel is:

Area of section/perimeter,

The section described above exhibits an area for biological plaques of about 40 ft²/ft³. Conventional rock is less than 40 percent of this specific surface.

The lengths may be full depth in a continuous section, from 6 to 18 inches; however, shorter lengths stacked to the total depth have advantages. The basic advantage is that the laminar boundary layer of liquid or the plaque starts at zero thickness and builds up. A length which is short compared to the length required to fully develop a stable laminar boundary layer keeps the dissolved oxygen supply to the plaque readily available. The diffusion gradient is increased in two ways. First the concentration is sustained at high levels, second the boundary layer thickness is decreased.

The length for a fully developed boundary layer in laminar flow is as great at 20 feet for water flowing in tubes of about 3/4 inch diameter in the limiting transitional range of Reynolds number, about 3,000. Expressing distance in terms of diameter, the transition length is about 1/10 to 1/20 the Reynolds number.

The flow in the spaced tubular media at the limiting laminar Reynolds number may be estimated. It is 22 million gallons/day per 1000 square feet of media surface. Hydraulic loading rates are conventionally less than 1 million gallons/day per 1,000 square feet. Thus, planned high hydraulic loading is feasible with this media.

Moreover, the uncompromised rates enables much higher organic loading. Instead of present upper limits of less than 70 pounds of BOD per day on each thousand cubic feet of media, three to four times this load appears feasible. The high organic loading only becomes practicable with preaeration which permits much higher hydraulic loading. All three variables. DO, hydraulic loading and organic loading, interact. Because of this, only a mutually compatible solution is feasible. In this instance the equipment and method involved bring into action the integrated benefit of efficient gas-liquid exchange and bioprocessing operations.

The structural details of the improved trickling filter utilizing a 134 media described hereinbefore are illustrated in FIG. 4 of the drawing which shows that a circularly-shaped housing 120 centrally mounts a carrying post 122 which receives the liquid effluent through pipe 124 carrying the aerated effluent discharge from the settling tanks. The post 122 rotatably carries a distributor arm 126 which is rotatably driven hydraulically by reaction or by a motor 128 connected thereto through shaft 130 and double flanged coupling 132. The liquid influent through pipe 124 passes up through center post 122 and actually distributes in a sprinkled relationship out the distributor arm as it is rotated by motor 128, all in substantially the conventional manner heretofore utilized in trickling filters.

In the particular construction utilized, some type of wire mesh to form a large circular bed indicated generally by numeral 134 is filled with loosely packed stones or the specialized materials defined above that offer promise of providing greater surface ranges per unit volume. As long as the problems of plugged liquid flow and undue gas-phase flow restrictions are considered, extended surface packing can be used effectively in this configuration. In any event, the liquid sent out by distributor arm 126 drips down through the packed beds 134 into the open base.

In addition, the invention contemplates utilizing a plurality of forced air blowers, each indicated generally by numeral 140 positioned around the periphery of the tank 120 and adapted to drive air in the direction indicated by the arrows 142. Since one of the purposes of such a trickling filter to reduce BOD count is to insure more oxygen is present to cause oxidation of the liqluid effluent, such forced air which must necessarily pass up through the bed in a reverse flow to the liquid flow therethrough, provides a considerable improvement in reducing the BOD count. Further, in order to provide the increased oxygen atmosphere, excess oxygen is actually injected into the effluent through pipe 144 into some type of turbulent mixing chamber 148, as appropriately controlled through valve 146. Also, in order to make the filter operate on nearly 100 percent humidity in the atmosphere, some type of roof covering indicated generally by numeral 150 may be provided that is supported by a catenary cable arrangement 152. Hence, the trickling filter may utilize 100 percent relative humidity, forced air circulation, and an oxygen enriched atmosphere because of the oxygen injection into the effluent. The increase in plant capacity and reduction in BOD is remarkable with this setup.

In this aerobic process it is also apparent that the design features described for improved sedimentation means may enhance the waste treatment system overall. In other words, oxygen injection into the sludge digestion unit 22 is contemplated so as to greatly enhance the operating capabilities of that unit to produce safe sludge concentrations.

The invention might also incorporate the addition of excess oxygen directly into the humidified atmosphere through a pipe 160 as controlled by valve 162. The control of the amount of oxygen entering might be appropriate provided by a suitable sensor 164 associated with the effluent output pipe 138 and operating in conjunction with a rate of flow instrument indicated by block 166, and an oxygen concentration unit indicated by block 168. Appropriate sensors 164a-d are associated with the rate of flow instrument 166 and oxygen concentration unit 168 to complete this setup, so as to control the actual amount of oxygen flow through pipe 160 for the most economical operation of the system.

BIOPROCESSING SECOND STAGE ACTIVATED SLUDGE

An activated sludge operation may be the sole bioprocessing unit or a secondary element in a two-stage bioprocessing operation. It is unlikely to find activated sludge as the initial element of a two-stage bioprocessing operation. This is in recognition of the sensitivity of activated sludge operations to fluctuating influent hydraulic or organic loads. Although not present typical practice, activated sludge operations may be adapted to handle fluctuating hydraulic and organic plant influent loads. This may be done by providing sufficient flexibility in circulation to accommodate independent balancing of hydraulic and organic load incident upon the activated sludge operation. This has been referred to before and will be discussed under system integration.

Regardless of the mode of application of the activated sludge operation, a predictable requirement exists for aeration. Observed aeration corresponds to from 500 to 700 cubic feet of air per pound of BOD removed. The implied oxygen requirement is from 7.5 to 10.5 pounds of oxygen per pound of BOD removed. An equivalent quantity is derived from surface aeration. Thus, the overall conventional requirement for oxygen is from 15 to 21 pounds of oxygen per pound of BOD removed. Recalling that BOD equates one to one with oxygen demand by definition, the implication is that oxygenation by aeration using conventional techniques is not remarkable for efficiency. This inference remains valid even allowing for available internal sources of oxygen as from the biological reduction of nitrates. This finding is to be expected since aeration efficiencies are often quoted in the range of 2 to 10 percent. It should be understood that the quoted values pertain to aeration of liquid having an initial DO of zero. This yields the highest possible efficiency. A more realistic efficiency is that for a DO in the range of 2 ppm.

The practical solution to the aeration question in activated sludge operations is set forth in my copending application identified above. The technique and equipment derives oxygen mixing efficiencies in excess of 50 percent. Use of such aeration means in the present activated sludge operation is visualized. This will require air compressor capacity reduced by as much as an order of magnitude and sludge recirculating pumps. The treatment method may be any of the seven basic methods utilized in activated sludge operations. What is important is the integration of efficient gas-liquid mixing techniques with this stage of bioprocessing.

From the activated sludge operation, treated waste discharges to secondary sedimentation.

SECONDARY SEDIMENTATION

In the case illustrated in FIG. 1, the processed waste from the activated sludge operation is discharged in a central influent as well as for primary sedimentation. Here, however, excess aeration to achieve degassing and enhanced flotation of grease is unnecessary. With this exception, the equipment and process operation may be as described for primary sedimentation previously. As might be expected, exceptions occur in the preferred disposition of effluent from secondary sedimentation.

For example, sedimented secondary sludge is removed conventionally, and returned to the influent of the activated sludge operation. Some of this flow is diverted so that excess sludge is fed to the primary digester. Clarified effluent is discharged to disinfection with diversion of necessary quantities to secondary recirculation. To achieve desired balance between the hydraulic and organic loading imposed by secondary recirculation intercepted partially sedimented flow may be incorporated in the secondary recirculation. This is shown in FIG. 1.

In the effluent from secondary sedimentation destined for disinfection, disinfection is initiated at the line exiting the secondaries. This technique exploits highly efficient gas-liquid mixing techniques described in the above-identified copending application. The disinfectant proposed is ozone-oxygen for several reasons. First, this disinfectant is effective with the organic loads present in brief contact times. Second, this disinfectant is potentiated, i.e., it acts synergistically in the presence of a secondary oxidizing system. The secondary oxidizing system may be ferric chloride added in secondary sedimentation to promote clarification, or it may be the standard chlorination additions. In either case, ozone-oxygen reduces the ultimate chlorine demand and ensures an effluent exhibiting relatively lower chlorine residues with high dissolved oxygen. The disinfection characteristics of ozone-oxygen and potentiating effects of ferric chloride are noted. The standard technique adds ferric chloride to secondary sedimentation system so it cooperates with $O_2$–$O_3$ added in disinfection.

OPTIMUM SYSTEM

System optimization in waste treatment is usually discussed in terms of a fictitious constant load. Optimization may not refer to meeting effluent quality standards of a minimum combined capital and operating cost.

CHARACTERISTIC LOAD

The characteristic waste load on a plant is a combined hydraulic and organic load. It is not constant during the day. It is likely to be repetitive day to day, excepting holidays and weekends. Rain and seasonal effects impose long period changes in load.

Weekday loads may be approximated reasonably well with a geometric series of few terms. It is not unusual to find that the range in load may be as great as ±75 percent of the average load. Somewhat in contrast with this fluctuating load, effluent criteria on quality typically require that a prescribed maximum never be exceeded. Practically, this means that plant regulation is aimed at achieving better quality with 0.95 or 0.99 probability. How much better the quality goal should be is a critical economic consideration.

Obviously, with a fixed output specification and a highly variable input, no fixed settings in process regulation will approach compliance and economy. An obvious approach is to accumulate mixed waste for residence times of a day to treat a continuous sample at the average daily rate. This would require large holding tanks and problems of settling, septicity and cost arise.

Despite these problems, great advantage accrues from the constant hydraulic and organic loading obtainable by optimum system utilization. The basic advantage is in simplicity of controlled, regulation of the plant process. The plant is essentially a servo system. To get a fixed output at a prescribed level, it would obviously be easier to find the fixed process settings to meet this level where the input is also fixed. With the actual input, the best process design and control is a then sophisticated problem. Although, this problem is a basic one economically, it has not yet received the attention it deserves.

In the equipment and process implementation of this concept, a dual attack on the design and control problem is proposed. Basic to the attack is provision of adequate flexibility in process control to enable a close approach to uniform hourly hydraulic and organic loading over a typical operating day. This minimizes the magnitude and effect of imposed fluctuations in hydraulic and organic load. The second basic element of approach is to provide process control to operate on the suppressed load variations to achieve the desired level of effluent quality continuously. This yields the optimum system in terms of minimized total cost to derive continuously the acceptable quality of effluent. Calculated performance, process conditions and basic factors in total cost have been determined and are set forth in more detail hereinafter.

With respect to the system optimization the ideal solution requires excessive sedimentation tank capacities, both in the primary and the secondary tanks. The practical answer is to compromise the flow.

Figure 11:
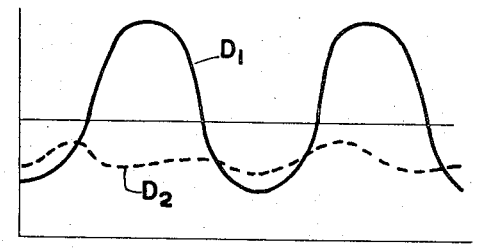
FIG. 11 is a graphic illustration of Case D also defined in the specification.

The example shows that for an arbitrarily variant inflow rate and organic load concentration, it is possible to achieve a process influent having a constant inflow rate and a constant organic load concentratin. The demonstrated condition pertains to the sedimentation tank influent in each example. Thereafter in the process, the hydraulic load varies with time, but the organic load concentration is held constant. The compromise condition allows a variation in hydraulic and in organic load to the sedimentation tank. Lower total influent rates to primary sedimentation result. The design condition is imposed next in the process. This means that the interval a–b overwhich integrals are considered is short or that point values are used. In addition, a simplified on-off control to approximate the exact solution is shown. This substitutes a rectangular region for integration in place of the region beneath a trigonometric curve, or an actual plot of station load, hydraulic and organic. Case D shows that where $Q_1 = 3.0$ for the 24 hour day rate, a total flow of 3.8 provides an optimum system flow. The flow condition yields a close approximation to constant organic load concentration to the trickling filter, as shown in the graph of FIG. 11. In an activated sludge process, the concentration could be held constant by return sludge rate controls. Hydraulic loads would vary in either illustration of the solid graph D1, or the dotted graph D2 of Case D.

Figure 8:
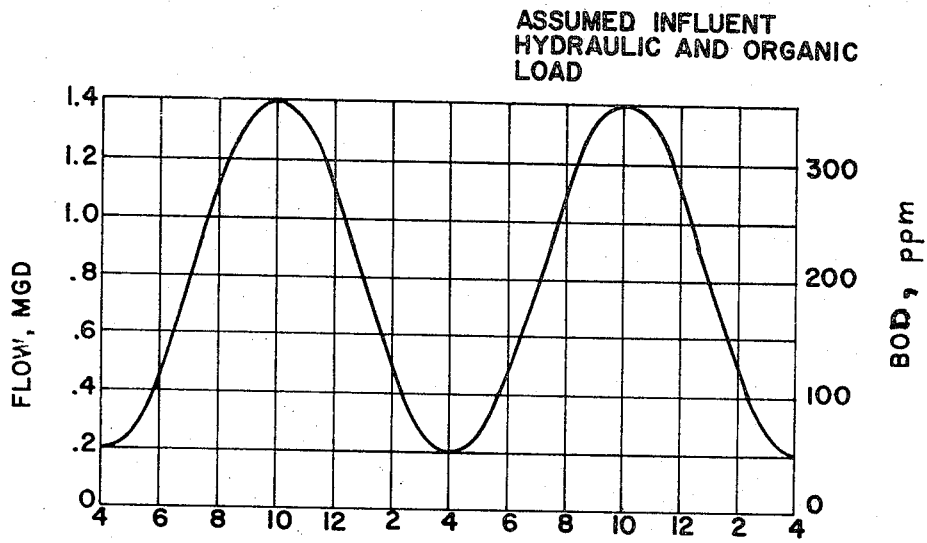
FIG. 8 is a graphic illustration of the assumed influent hydraulic and organic load.
Figure 9:
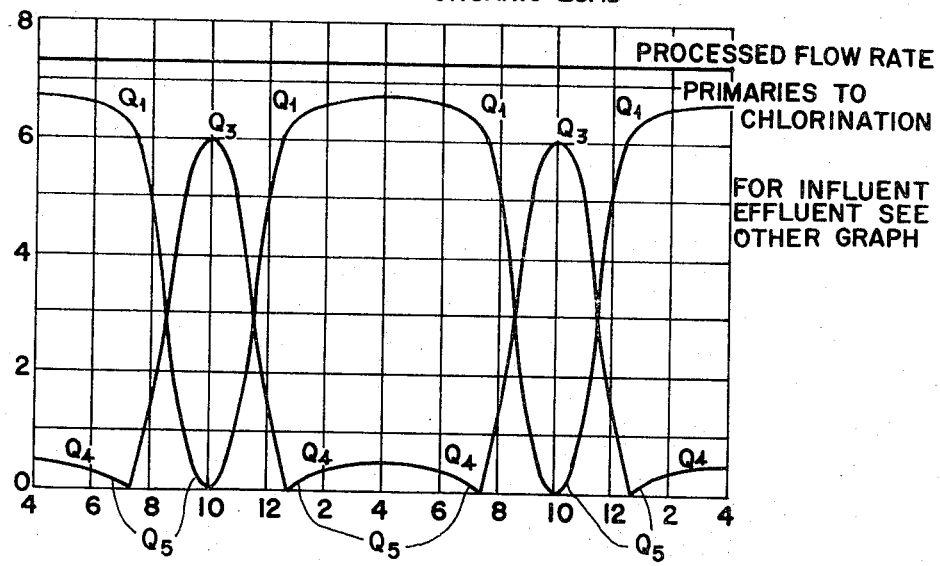
FIG. 9 is a graphic illustration of the optimum system process flow rates for Case A and a variable influent for Case B with constant process flow with a fixed effluent quality and fixed hydraulic/organic load.
Figure 7:
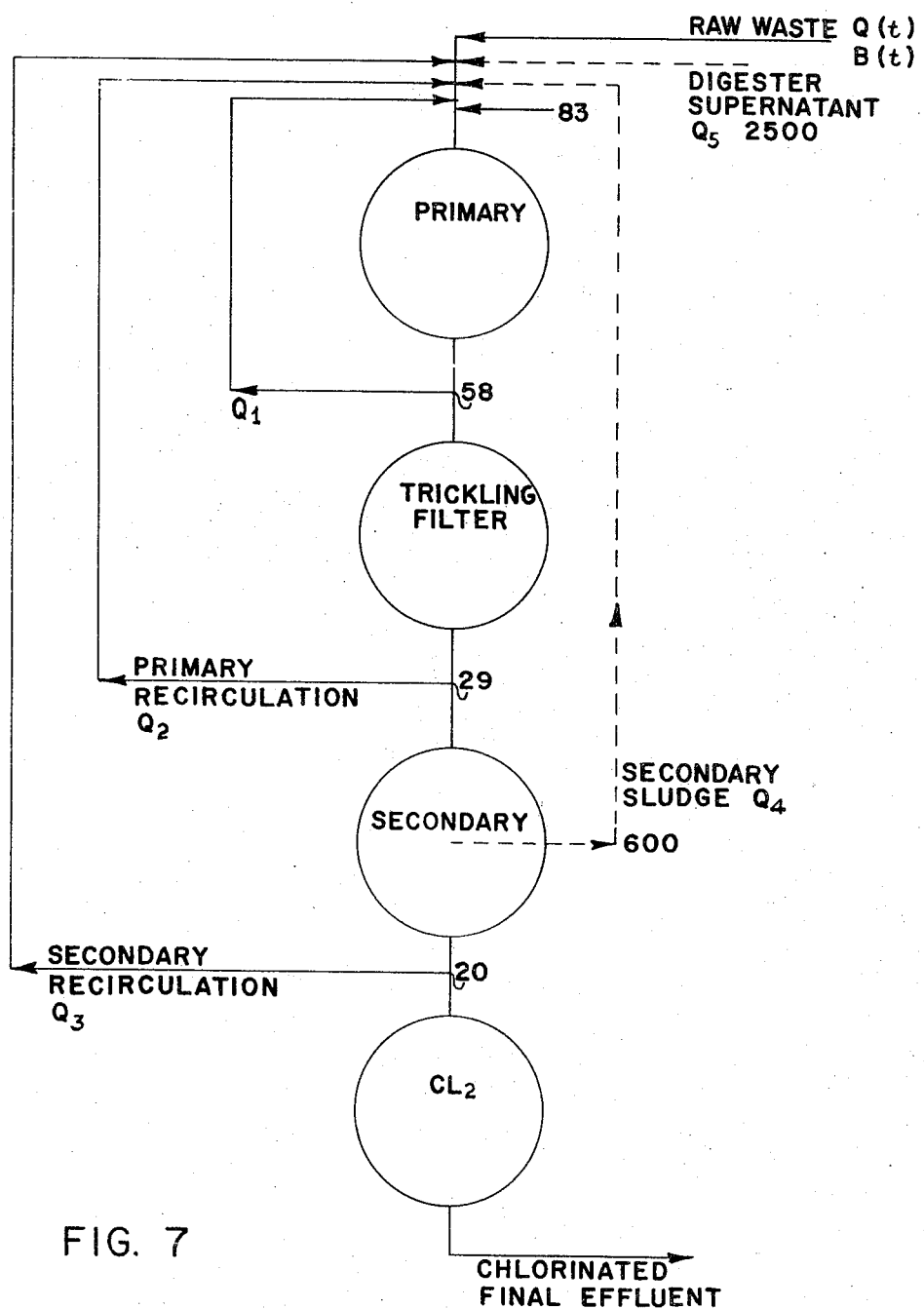
FIG. 7 is a flow diagram of a modified basic system illustrating system optimization and flow control.
Figure 10:
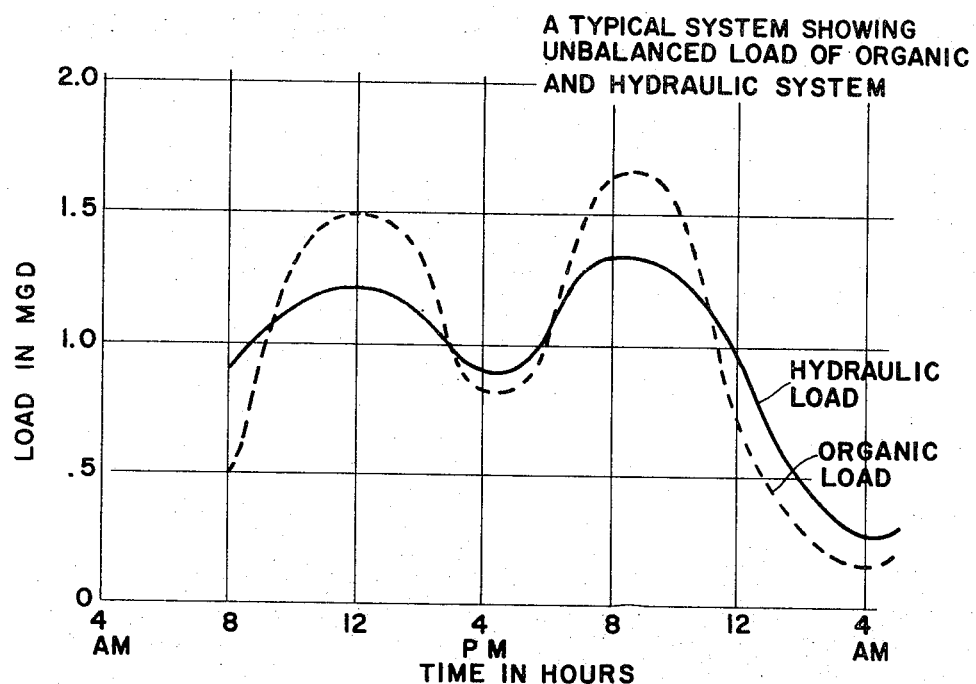
FIG. 10 is a graphic illustration of the flow load system optimization in Cases A, B and C defined in the specification.

Case A — Schematic flow sheet shown in FIG. 10 illustrates conditions for uniform hydraulic and organic load with an arbitrary variable incident load. The figures shown between sections in FIG. 8 are the BOD of the treated waste in ppm. Case A, also shown by the graphs of FIGS. 8 and 9, uses process control of flow in $Q_1$, $Q_3$, $Q_4$ and $Q_5$. $Q_2$ may be held at zero.

Maximum Load — $Q = 1.4$ MGD · $B = 350$ ppm.
Secondary recirculation for 10:00 AM/PM load.
I. (BOD) $83 \cdot [Q + Q_3] = 1.4 \times 350 + 3 \cdot 20$
$Q_3 = 1.4 [350/83]/83 - 20 = 1.4 \cdot 267/63 = 5.93$
Recirculation ratio; $R = 5.93 - 1.4/1.4 = 3.24$
Flow to primary: 5.93 MGD rate
Secondary recirculation for 8:00 and 12:00 AM/PM load.
$83 \times 5.93 = 1.1 \times 275 + 20 \ Q_3 = 58 \ [483 - Q_3]$
$Q_3 = 107.5/38 = 2.83$
$Q_1 = 4.83 - Q_3 - 2.0$
Secondary recirculation, other flows, 7:00 and 1:00 AM/PM.
This is the average load condition.
$83 \cdot 5.93 = 0.8 \times 200 + 20 \ Q_3 + 58 \ [5.13 - Q_3]$ and, if $Q_3$ is zero:
$5.93 \times 83 = 0.8 \times 200 + 20 \ Q_3 + 58 \ [5.13 - Q_3] \ 492 + 34 = 20 \ Q_3 - 58 \ Q_3$
$Q_3 = -34/38 =$ approximately $-1.0$
II. Case for 8:00 and 12:00 AM/PM
$83 \times 7.33 = 1.1 \times 275 + 20 \ Q_3 = 58 \ [6.23 - Q_3]$
$610 = 20 \ Q_3 - 58 \ Q_3 = -38 \ Q_3$
$Q_3 = 54/38 = 1.42$
$Q_1 = 6.23 - 1.42 = 4.81$
III. Case for 7:00 and 1:00 AM/PM Average load.
$83 \times 7.33 = 0.8 \times 200 + 20 \ Q_3 + 58 \ [6.53 - Q_3]$
$610 - 160 - 379 = 71 = -38 \ Q_3$, but for $Q_3 = 0$
$71 = 58 \ Q_1$, $Q_1 - 71/58 = 1.23$
flow check $6.53 \ B + 0.8 \times 200 = 83 \times 7.33$
$6.53 \ B = 450$
$B = 450/6.53 = 69$
flow must shift to $Q_1 + Q_4$ continued percent solids primary 3% and percent solids secondary 6%
Primary sludge 3% at 7.33 MGD = 0.22 MGD
BOD = 83 − 58 approximately
Average supplied = approximately 2500.
IV. $83 \cdot 7.33 = 0.8 \times 200 + 600 \ Q_4 + 58 \ [6.53 - Q_4]$
$+71 = 600 \ Q_4 \oplus 58 \ Q_4$
$Q_4 = 71/542 = 0.131$ MGD
then $Q_1 = 6.40$ MGD
V. Conditions at 6:00 and 2:00 AM/PM
$83 \cdot 7.33 = 0.5 + 125 + 600 \ Q_4 + 58 \ [6.83 - Q_4]$
$151 = 600 \ Q_4 - 58 \ Q_4$
$Q_4 = 0.279$ MGD
$Q_1 = 6.55$ MGD
VI. Conditions at 5:00 and 3:00 AM/PM.
$83 \cdot 7.33 - 0.28 \cdot 70 + 600 \ Q_4 + 58 \ [7.05 - Q_4]$
$181 = 600 \ Q_4 - 58 \ Q_4$
$Q_4 = 0.33$ MGD
$Q_1 = 6.72$ MGD
VII. Conditions at 4:30 and 3:30 AM/PM
$83 \cdot 7.33 = 0.22 \times 55 + 2500 \cdot Q_5 + 58 \ [7.11 - Q_5]$
$Q_5 = 0.89$ MGD. or
showing alternative for secondary sludge method of digestes supernatant
$83 \cdot 7.33 - 0.22 \times 55 + 600 \ Q_4 + 58 \ [7.11 - Q_4]$
$186 - Q_4 \ [600 - 58]$
$Q_4 - 0.343$ MGD
$Q_1 - 6.77$ MGD
Conditions at 9:00 and 11.00 AM/PM
$83 \cdot 7.33 = 1.32 \times 327 + 20 \ Q_3 + 58 \ [6.0 - Q_3]$
VIII. Conditions at 8:30 and 11.30 AM/PM
$83 \cdot 7.33 - 1.22 \times 305 + 20 \ Q_3 + 58 \ [6.11 - Q_3]$
$Q_1 = 3.11$; $Q_3 = 3.0$
IX. Condition at 9:00 and 11:00 AM/PM
$83 \cdot 7.33 = 1.32 \times 330 + 20 \ Q_3 + 58 \ [6.0 - Q_3]$
$-174. = -38 \ Q_3$;
$Q_3 = 4.58$; $Q_1 = 1.42$
X. Condition at 9:30 and 10:30 AM/PM
$83 \cdot 7.33 = 1.38 \times 345 + 20 \ Q_3 + 58 \ [5.95 - Q_3]$
$-211. = -38 \ Q_3$; $Q_3 = 5.55$
$Q_1 = 0.4$ Case A Pump Capacities — Flow around primary sedimentation equals gravity. Flow around tridkling filter equals zero. Flow around secondary sedimentation equals $Q_1 - Q_4 = 6.4$. Flow from secondary sludge equals 0.4. Then, $0.400,000./24 \cdot 60 = 278$ GPM. Use 300. GPM 2:150 GPM Secondary 6.4/1440 − 4,450. ; Use 4:1200 GPM

| Equipment sizing Case A | |
|---|---|
| Primaries: 4 | 60′Diameter |
| Secondaries 4 | 60′Diameter |
| Trickling Filter 2 | 75′Diameter |

System Characteristics — Large sedimentation requirements Moderate Pumping requirements. Conservative bioprocessing requirements. Fixed effluent BOD to chlorination of 20 ppm, with influent BOD's from 50 to 350. BOD reduction is from 94.3 to 43 percent.

A second case may be examined. It reduces primary and secondary sedimentation requirements, as it appears that a practical variation from the illustrative Case A which has been described above, is based on a compromise at the peak flow condition occurring at 10:00 AM/PM. The compromise is to accept a system condition as at 9:00 or 11:00 AM/PM for the hydraulic load. An organic load in ppm can be held constant. Instead of the ideal situation, holding the hydraulic load constant, 24 hours per day, we hold the system hydraulic load at the 9–11 level. Then, in the interval 9–11 AM/PM, i.e., twice a day, for 2 hours, a hydraulic overload is allowed. This only affects the primary and secondary sedimentation tanks, and not seriously, in comparison with the cost reduction enabled. Except in the interval 9–11, the system hydraulic and organic load may be held constant.

Of course, other compromise expedients may be selected. For example, the interval might be 8–12. For the three cases, A, 9–10, 8–12, the relative flows are 1.4, 1.32 and 1.1. Most state laws require that sedimentation tanks be proportioned to accommodate specific overflow rates expressed as MGD per unit of surface area. Thus, reducing from 1.4 to 1.1 means that the required area reduction is 3/1.4 which is roughly proportional to the cost reduction.

The all or none flows shown are typical of practical manual control. Valve settings may be made and left for an appreciable time. This type of control is also amenable to automatic regulation of the plant. Simple time controls can accomplish this type of regulation.

The previous discussion involved more sophisticated controls typical of usual servo control system. The foregoing conditions are a convenience in calculation. The calculations set forth above and the graphs of FIGS. 8 through 11 are based on controls of definite integrals. The integrals concerned are of the form:

$Q = b/a \; q \; c \; dt$, where:
 $Q$ is an organic load
 $a, b$ are time limits for the load increment considered
 $q$ is a flow rate
 $dt$ is differential time.

In effect, control is based on manipulation of definite integrals to approximate organic load concentrations at indicated points in the overall process. A particular case is shown at the influent to the sedimentation tank where the organic load and the hydraulic load are held at constant values. The effect on increased overflow rates at the sedimentation tank has been noted above.

To relax the overflow rates at primary sedimentation, it is feasible to impose the condition for constant hydraulic and organic load at bioprocessing. For a trickling filter or an activated sludge unit operation, it is desirable to hold the hydraulic and also the organic load constant. This is particularly so of activated sludge unit operations. To illustrate this condition, a limited number of calculations as set forth above are indicated to show a typical solution.

DISINFECTION SYSTEM

Figure 5:
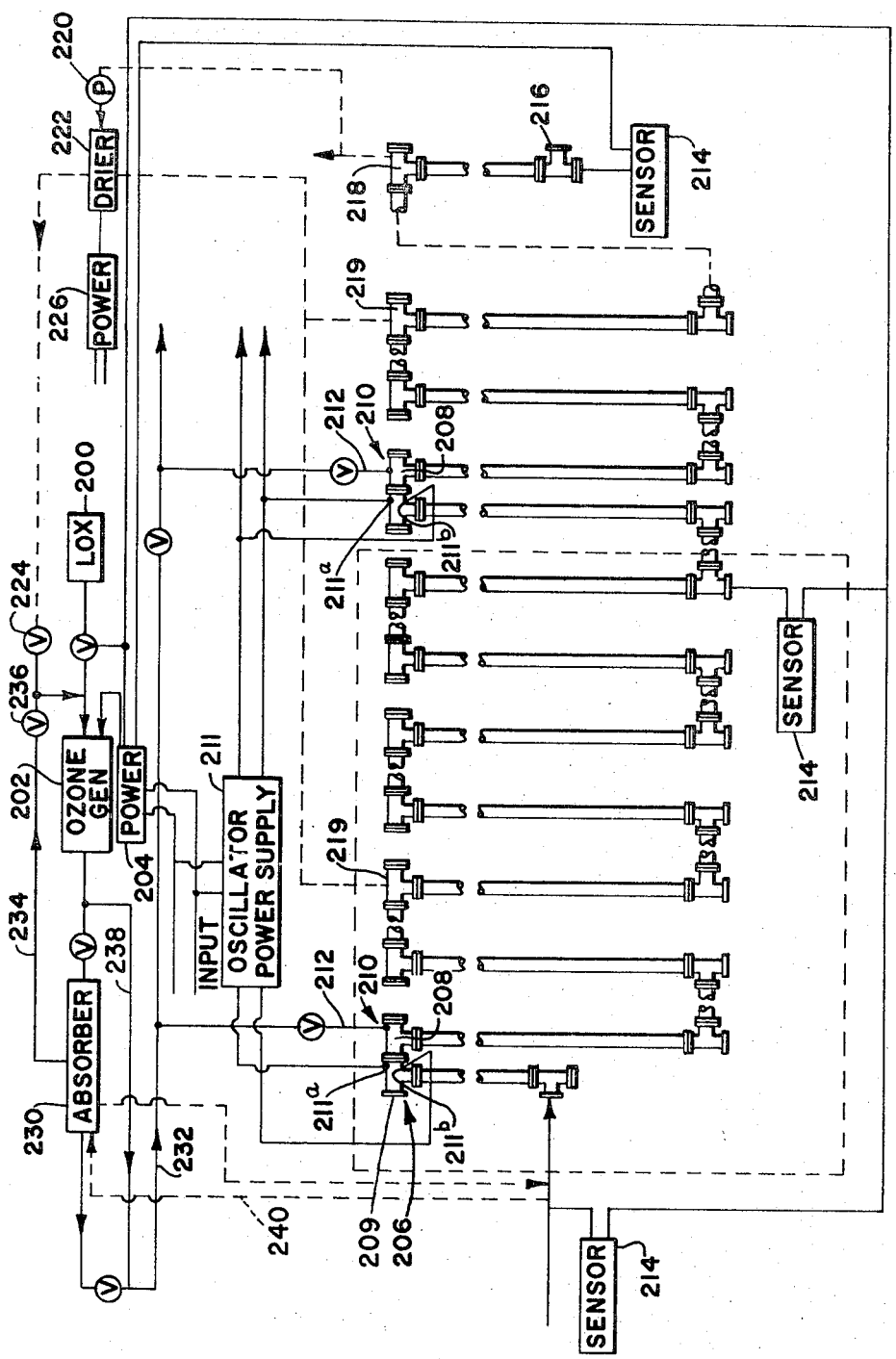
FIG. 5 is a schematic flow diagram of the disinfectant unit indicating the operation under a hydraulic gradient with sensors and gas input control.

The disinfection system indicated in FIG. 5 of the drawings is a gas-liquid mixing system operating under a hydraulic pressure gradient. It is comprised of a liquid oxygen supply 200, an ozone source or generator 202, an oscillator power supply 204, and a process flow line indicated generally by numeral 206. The line 206 operates in the regime of turbulent flow, at or above a Reynolds number of 3,000. High momentum exchange mixing elements are carried in at least certain of the T-shaped flanges 208. These mixing elements are normally flat plate orifices 208a which induce intense mixing sufficient to minimize radial concentration gradients in the processed liquid effluent entering the flow line 206 at 209. The mixing elements 208a may be followed by sting-type cantilevers 210 driven by a tunable source 211 excited at or near their natural frequency. These may be positioned in relation to the gas injecting means to further enhance the momentum exchange in primary regard to minimizing concentration gradients occurring in the angular direction in addition to the radial gradient suppression induced by the basic mixing element, the flat plate orifice. In addition, the primary objective is to have the stings 210 provide mechanical disruptive forces on flocs, plaques, or agglomerates which may be present in the processed liquid effluent. The objective of imposing disruptive forces is to reduce the size and to extend the available surface for disinfection on such flocs, plaques or agglomerates.

The orifices 208a in the T's 208 are provided at the flange joints as a matter of convenience. The orifice diameter ratio to the pipe diameter is typically equal to or greater than 0.7. In the T's 208 securing the orifices 208a, two other elements are mounted. One is an $O_3$–$O_2$ injector 212. The injector 212 is introduced in a fitting ideally centrally allowing axial positioning which extends through the orifice preferably to or slightly past the vena contracta formed by the flow through the orifice. Optimal injection is found to be with minimum concentration gradient in the flow direction. This is most conveniently obtained by making the fluid flow rate steady over short or longer intervals of time and by similar proportional control of gas flow. The sting 210 is the second element introduced with similar provision for axial position and sealing as the injector 212.

The $O_3$ – $O_2$ injection occurs at approximately 5 percent or less concentration by weight of ozone in oxygen. For generalized disinfection, it is introduced in amounts greater than 0.5 milligrams of ozone per liter of fluid. The injected concentration will attenuate in the flow line. Two factors cause the attenuation. One is the decomposition rate for $O_3$ in water leading to $O_2$. The second attenuating factor is the oxidation load of the material contained in the processed liquid. In the typical waste, this is comprised of organic materials incompletely oxidized to stable forms. These materials in conjunction with oxidizable inorganic constituents comprise the BOD load of waste.

Recognizing that $O_3$ attenuation will occur, it may be necessary to utilize sequential injection. This aspect is shown in FIG. 5. FIG. 5 also indicates a series of test points in the flow line between injection points for the $O_3$ which include sensors 214 that act to control a power supply 204 to the generator 202. These sensors 214 are useful to assess quantitatively the $O_3$ concentration and the BOD reduction. For a given Reynolds number, these data provide information on time and position. This information is essential for design of the flow system and for determining the optimum $O_3$ injection flow rate. For generalized disinfection, it is important to the invention that the injection rate and interval be such that the attenuated $O_3$ concentration exceeds 0.5 milligrams of ozone per liter of effluent at all points in the system in which generalized disinfection is to occur. In contrast, specialized disinfection as of obligate anaerobic forms of bacteria may be sustained with aid of oxygen containing only trace qualities of ozone as usually found in concentrations of 0.01 ppm or less. This process and implementation is detailed in my above identified copending application.

From the above, the purpose for sequential injection is clear. The number of points, or the distance or time in the flow line will depend upon the impressed oxidation load and particulate size of this load. It is anticipated that in normally operating systems, the time for processing will not exceed 8 minutes. It should be understood that the piping system indicated in FIG. 5 will normally extend in a vertical direction wherein the entrance at 209 and discharge at 216 are at comparable horizontal locations so that in essence a hydraulic gradient is present when considering the system as a whole. The relative vertical location of these points is immaterial to the effectiveness of the disinfection system.

The actual construction of a T 208 showing the flat plate orifice 208a, the centrally positioned $O_2 - O_3$ injector 212, and the oscillating sting 210 in greater detail is shown in FIG. 6 of the drawings.

The invention also contemplates that excess oxygen can be picked off the piping system at point 218 by a suitable pump 220 and sent into a drier 222 for transfer therefrom through a control valve 224 into the supply line from the liquid oxygen source 200 to the ozone generator 202. A suitable power supply 226 activates the drier 222.

An absorber indicated by block 230 might be included to receive the output from generator 202 before passing the ozone concentrated fluid into a supply line 232 so as to remove all excess oxygen with the excess oxygen fed back over line 234 and through valve 236 to the supply to generator 202. The absorber 230 is optional as the $O_3 - O_2$ concentration can pass directly through line 238.

In some instances, it might also be desirable to have processed liquid effluent entering at point 209 into the piping system 206 pass through some type of absorber to degas or desorb $O_2$ out of the effluent since you can't get new $O_3$ into the fluid in an $O_2$ carrier gas if the fluid is saturated with $O_2$. A dotted line 240 illustrates this optional arrangement.

It should be understood that the system described hereinabove calls for the preferred implementation utilizing a liquid oxygen feed. This may be refined incorporating recycled, dried, and recovered oxygen. However, continuous recirculation may not be feasible, and in this case it is apparent that there exists a desirable bleed-feed rate for the oxygen supply. The rate should satisfy the DO requirements on effluent and the argon dilution problem whereby ozonation efficiency may degrade with increasing concentrations of contaminant gases. Also, the installed capacity of the bleedfed $O_2$ supply should be at the average anticipated $O_3 - O_2$ demand. This will minimize the capital investment required.

With reference to the passage of the effluent through absorber 230, it has been found that 7 to 40 ppm may be recovered from the effluent before discharge for use in the oxygen enriched process in the waste treatment system. Other techniques other than desorbing that might be utilized would either be heating or cavitation, where the cavitation might invole ultrasonic excitation as set forth in my above identified co-pending application.

It should also be noted that the entire disinfection process set forth preferably uses liquid oxygen feed, not air, thus avoiding the presence of nitrogen. In using only oxygen as described, a number of significant improvements naturally follow. It is a known physical fact that the potential solubility of oxygen in water if five to six times as great if introduced in equilibrium for oxygen enabling a higher concentration of ozone to be injected while less oxygen is required. The elimination of oxides of nitrogen contributes to safety and air pollution control. Further, the availability of oxygen for recycling and for process enhancement reduces the oxygen expense by an order of magnitude or more while the process enhancement is increased as pointed out above.

Also, recovered oxygen may be utilized in the trickling filter or activated sludge operation by oxygen-effluent injection, or by enrichment with this oxygen of a basic air-effluent injection means. In this way a trickling filter bed should maintain aerobic metabolic rates at maximum quantitative levels throughout its entire depth. A similar effect on the activated sludge operation is possible. The effect on increased BOD reduction is apparent

FORCE MAIN INJECTION

The aeration for force main injection has been practiced in the range of 4 parts of air in from 10,000 to 100,000 parts of fluid by weight. The volume concentrations need not exceed 50 percent of air in liquid. For force main injection, useful results may be realized to much lower levels, perhaps as low as 1–5 percent by volume. Wet well aeration may be effective at appreciably lower feed rates. The limitation for this case depends on degassing at the impeller eye, leading to eventual loss of pump prime. This problem is also more fully covered in my above-identified co-pending application.

The saturation levels for aeration of water are near 20 parts per million by weight. For waste, somewhat lower saturation limits may be expected in view of the presence of additional contaminating gases and dissolved materials, i.e, for aeration. In the oxygenation case, water saturation levels are in the range 40 to 50 ppm, by weight. For ozonation with oxygen as the carrier, at 6 percent ozone in oxygen, by weight, the saturation range corresponds to ozone in liquid concentrations of about 2.5 ppm, by weight. The foregoing ranges may be useful as depicting preferred ranges of gas concentration.

As is known, force main operate intermittently according to the influent rate to the wet well and the level settings used to control the pumps. When the pumps shut down, a pressure wave travels through the system, is reflected, returns, and oscillates periodically ultimately damping out. The pressure fluctuations occur below and above the static pressure level in the line. The pressure differences may compare with the dynamic-static pressure difference or they may exceed this difference. Such pressure waves are referred to as water hammer. Air present in force main incident to aeration to control septicity affects these pressure waves. The presence of air reduces the pressure differences, it reduces the velocity of the pressure waves in the force main, from one end to the other and the air damps out the pressure oscillation rapidly, all in comparison to the force main response to pump shut down without air injection to the force main. All these results are beneficial and are a bonus accruing from the practice of air injection to force mains. Thus, it is apparent that force main used for waste, water, or liquid generally, such as oil, may benefit from aeration, or inert gas injection as with nitrogen or carbon dioxide. Preferred gases are those which are not unduly reactive and which exhibit low saturation levels in the liquid transported. This reduces the gas compressor capacity required to inject an excess of gas beyond the saturation concentration. The beneficial results on pressure reduction occur predominantly from undissolved gas.

A dispersed municipal collection system was equipped with aeration equipment according to the principles set forth. Before aeration, waste received at the processing plant was septic, exhibited zero or trace dissolved oxygen and exerted no demand on oxygen saturation in the waste after it entered the plant.

In constrast, after all force mains and wet wells were aerated, the dissolved oxygen of received raw waste reached 3.4 ppm. The waste was treatable as indicated by its oxygen demand of more than 1.0 ppm per hour. The dissolved oxygen content sufficed to sustain aerobic conditions throughout primary sedimentation. The effluent from this first stage of processing still exhibited a dissolved oxygen concentration exceeding 1.0 ppm. These results dramatically attest to the efficacy of these teachings of aeration. The desired suppression of odor from septic decomposition was a noticeable further result.

CHLORINIZATION

It should be understood that the invention further contemplates that chlorine mixing utilizing the flat plate orifices and injection at numerous points under high momentum exchange mixing conditions is clearly possible. The use of chlorine in a gaseous state for gaseous mixing injection or as a liquid is contemplated by this invention. FIG. 1 illustrates more typical points of injection for a chlorine and water solution through line 40 into line 36 to the effluent from the secondary sedimentation tank 24. Further, the invention quite definitely contemplates the injection of chlorine in the disinfection portion 38 of FIG. 1.

SEDIMENTATION

The invention contemplates the injection of aluminum chloride or some other suitable sedimenting agent into the effluent at some point in the process to very definitely assist in clearing the water when it is finally injected into a stream, river, or the like. With the use of aluminum chloride, the invention contemplates the injection of about 25 to 100 parts per million, with this being followed by a polymer injection after a delay of two to three minutes. The aluminum chloride injection might take place for example in a somewhat rectangularly shaped trough 135 mounted in the bottom of the trickling filter tank 120 of FIG. 4. This trough 135 would collect all the water which trickled down through the filter media and then be passed through the output line 138. In order to inject the aluminum chloride into the effluent at this point, a plurality of transversely extending pipes 137 are mounted to extend across the trough 135, again as best seen in FIG. 14, with the aluminum chloride injection being through a pipe 139 which individually communicates with each of the four pipes 137 illustrated in FIG. 4.

Further mixing of the aluminum chloride is then followed in its passage of pipe 138 by entry into a multiple short tube section indicated by numeral 141 which is primarily designed for mixing. In addition, because of the slow flow rate through the trough 136, the injection of a polyelectrolyte resin may be made into the end of the multiple short tube section 141 to achieve the affect of a flocculating agent as is well known in the art. The short tube effects a highly effective mixing arrangement. A single short tube is illustrated schematically in FIG. 13, and is illustrated generally by numeral 143. The tube in effect comprises a reduced diameter short tube section 145 which is coaxially mounted within the outer normal diameter tube section 147. The entry into the short tube section 145 is with a flat blunt 90° angular flange 151 so that considerable and extreme turbulence is present within the short tube section 145. The injection of the polyelectrolyte resin, or any other suitable resin might be through a small injection tube 153 which is positioned so as to be approximately two and one-half diameters of the small tube 145 from the entrance with the flow being in the direction of arrow 155.

Thus, with the short tube, it should be understood that the entrance and exit from the tube creates a mixing, and that such short tubes can be positioned coaxially in existing conduits or extensions of existing conduits. For example, in the section 141, it is contempated that perhaps three short tubes would be arranged in side by side bundle relationship with flow being in one end of one down through and reversing its direction coming back through a second, and then reversing its direction a third time to pass out through a third short tube. This particular short tube arrangement might actually have a total length in the three short tubes of twenty diameters of an individual one, and preferably should not have less than a ten diameter length.

It is, however, desirable that the mixing be accomplished under a low shear condition, particularly for the polyelectrolyte resin which should be inserted at between 0.2 to 0.6 ppm and between 1½ to 3½ minutes following the injection of the aluminum chloride. It should be at an actual concentration of 1 percent or less in water.

Again, with reference to the short tube, the transition length of the tube should be greater than 0.5 and preferably between about 0.75 to about 0.9 with these figures being the ratio of the orifice diameter to the actual diameter of the large flowing pipe or pipe 147 in FIG. 13.

In actuality the stream within the short tube of FIG. 13 if flowing under high pressure is probably contracted somewhat more for a given depth of water or given pressure head. We have found that the best length for the tube 145 should probably be about 2.5 diameters. Under these conditions, the head loss is 0.328H where H is hydraulic head upstream of the tube if the tube 145 is vented, it may allow full flow through the tube rather than the contracted flow defined above. However, we have found that no venting of such tubes needs to take place. Actually, for most efficient mixing, a non laminar flow through the tube 145 is highly desirable.

The use of the short tube also is achieving mixing under a hydraulic gradient, rather than a gravitional gradient, and in this manner, high efficiency as well as saturation above existing levels in gravitational systems is definitely achieved.

Another important aspect of the introduction of gas into the system by inserting more gas than that required to saturate the liquid is that pump prime is not lost, but that in this manner pipe knock caused by pumping is significantly dampened.

NITRIFICATION

Standard processes involve carbonaceous BOD reduction. However, new state and federal requirements are being imposed for nitrogenous oxygen demand reduction, or NOD. The process defined above, and particularly that as associated with FIG. 1 of the drawings as being the optimum system uses either all a nitrification teaching, or all break point chlorination, or a split somewhere between these two. Preferably, the system should be based on a two stage trickling filtration with return of stabilized digester supernatant. This makes the trickling filters convert all the nitrogen to ammonia or $NH_3$. $NH_3$ is then separately oxidized to nitrate, or $NO_3$ or by break point chlorination to monochloramine.

The oxidation of the $NH_3$ to $NO_3$ requires four to five to six times the $NH_3$-nitrogen concentration currently available in present systems. Specifically, this amounts in the system designed above to 140 ppm of oxygen. Thus, for properly aerated waste with oxygen, a closed extended out fall line would allow the oxygen use to achieve the breakdown of the $NH_3$ to $NO_3$. This would preferably be done before disinfection, and is shown by the $CL_2+H_2O$ injection over line 40 in FIG. 1. Then, disinfection would occur after nitrification. It seems more practical to utilize a supplemental aerobic process such as an aerobic digester type of sedimentation tank, holding about 1 to 2 days flow in such tank. The required air to achieve the oxygen needs would be provided by injection at the many points illustrated in FIG. 1.

The effluent can also be under a pressure in its flow path, so that it will be under several gravities load, for example. Under this processing condition, much greater concentrations of gas or fluid can be saturated thereinto. The effluent would be maintained under pressure until processing was fully completed. Aeration is believed to be more efficient and easier under such a pressure system.

SYSTEM INTEGRATION

The arrangement of the overall units of FIG. 1 can function in waste treatment. One mode of operation is to allow all elements to float on line as the influent hydraulic and organic load changes. Typical changes in these two loads are high. In terms of an average daily load, the range may be as great as ± 75 percent of the average load. Regulatory authorities usually stipulate that at no time shall prescribed limits for effluent quality be exceeded. With a highly variable input load, this means either that the process must be controlled to over treat waste most of the time, or that relating sophisticated control is necessary to achieve the necessary degree of treatment at any time. Both capiital and operating expenses are lower in the latter case. However, the usual engineering unit tends toward the former technique. It is the approach and simplified controls and regulation to achieve a degree of treatment satisfactory for a fixed design condition. For any other input loading, effluent quality will vary.

Tests have shown that using the system with the sedimentation tank defined herein the DO level to the tank is about 2 to 3 ppm, and out of the tank about 1 to 1½ ppm to definitely maintain the aerobic condition. This aerobic condition remains between 20 to 40 minutes after the effluent leaves the sedimentation tank.

While in accordance with the patent statues only one best known embodiment of the invention has been described in detail, it is to be particularly understood that the invention is not limited thereto or thereby, but that the inventive scope is defined in the appended claims.

What is claimed is:

1. A system for pollution suppression which comprises
    a primary sedimentation tank, means to inject raw waste effluent into the tank for settling action,
    a digester, means to withdraw sludge from the primary sedimentation tank and feed it to the digester,
    a primary bioprocessing tank, means to feed the effluent from the primary sedimentation tank to the primary bioprocessing tank,
    a secondary sedimentation tank, means to deliver the effluent from the primary bioprocessing tank to said secondary sedimentation tank,
    a disinfection tank, means to add a disinfectant to the disinfection tank, and means for delivery of the effluent from the secondary sedimentation tank to said disinfection tank and discharging fully processed effluent therefrom,
    first injection means for selectively injecting an oxygen containing fluid under high momentum exchange conditions into the effluent at any point in the pollution suppression system prior to said disinfection tank, and
    means to selectively inject an oxygen containing gas into effluent from said disinfection tank to maintain a high dissolved oxygen content in said disinfected effluent.

2. A system according to claim 1 where the fluid is an oxygen containing gas, and which includes means to inject a disinfectant into the influent to the disinfection tank under high momentum exchange conditions.

3. A system according to claim 2 where the disinfectant is chlorine and said chlorine is injected as a liquid solution.

4. A system according to claim 1 where the means for selectively injecting is a short tube within the system flow, said tube having a reduced diameter sharp angled entrance, and a length equal to at least several diameters of the entrance, and the fluid is injected into the effluent as it flows through the short tube.

5. A system according to claim 1 which includes means to maintain the effluent under a pressure head throughout its flow path to increase the level of gas soluability thereinto.

6. A system according to claim 4 including a plurality of short tubes located throughout the flow path of the effluent in the system, and at least two short tubes bundled together in a reversal effluent flow path where the bundled short tubes have a combined length of at least ten of their hydraulic diameters.

7. A system according to claim 1 including a collection trough beneath the bioprocessing tank, means to inject a suitable sedimentating agent into the effluent collected in the trough, means subsequently injecting a flocculating agent into the effluent under high momentum exchange conditions to interreact with the sedimentating agent.

8. A system according to claim 1 including means to effect nitrogeneous oxygen demand reduction in the system.

9. A system for pollution suppression according to claim 1 where said first injection means communicates with the influent of said primary sedimentation tank.

10. A system for pollution suppression according to claim 1 which includes means to feed supernatant from said digester back to said primary sedimentation tank and where said first injection means communicates with said digester supernatant.

11. A system for pollution suppression according to claim 1 which includes means to recirculate a portion of the effluent from said primary bioprocessing tank to said primary sedimentation tank and where said first injection means communicates with said recirculated effluent.

12. A system for pollution suppression according to claim 9 which includes means to feed supernatant from said digester back to said primary sedimentation tank and where said first injection means communicates with said digester supernatant.

13. A system for pollution suppression according to claim 9 which includes means to recirculate a portion of the effluent from said primary bioprocessing tank to said primary sedimentation tank and said first injection means communicates with said recirculated effluent.

14. A system for pollution suppression according to claim 10 which includes means to recirculate a portion of the effluent from said primary bioprocessing tank to said primary sedimentation tank and said first injection means communicates with said recirculated effluent.

15. A system for pollution suppression according to claim 14 where said first injection means communicates with the influent of said primary sedimentation tank.

16. A system for pollution suppression according to claim 1 wherein said first injection means communicates with the inlet of said secondary sedimentation tank.

17. A system for pollution suppression according to claim 1 including means for recirculating a portion of the effluent from said secondary sedimentation tank to said bioprocessing tank and said first injection means communicating with said means for recirculating.

18. A system for pollution suppression according to claim 1 having a secondary bioprocessing tank, means for recirculating clarified liquor from said secondary sedimentation tank to said secondary bioprocessing tank and said first injection means communicating with said means for recirculating clarified liquor.

19. A system according to claim 2 where the disinfectant is ozone in an oxygen containing carrier gas.

20. A system for pollution suppression according to claim 7 wherein said sedimentating agent is selected from the class consisting of aluminum chloride and ferric chloride.

21. A system for pollution suppression according to claim 7 including means for injecting and mixing said sedimentating agent.

22. A system for pollution suppression according to claim 1 which contains a trough for collecting a portion of the effluent and the addition of a suitable sedimentating agent into said effluent collected in said trough.

23. A system for pollution suppression according to claim 22 wherein said trough is located beneath said primary bioprocessing tank.

24. A system for pollution suppression according to claim 1 including means to add a polyelectrolyte resin.

25. A system for pollution suppression according to claim 24 including means for injecting and mixing said polyelectrolytic agent.

26. A system for pollution suppression according to claim 25 wherein said polyelectrolytic injection mixing means is a short tube.

27. A system for pollution suppression according to claim 24 wherein said polyelectrolytic agent is selected from the class of anionic polymers, cationic polymers and nonionic polymers.

28. A system for pollution suppression according to claim 27 which includes means to add cationic polymers to flocculate the sludge.

29. A system for pollution suppression according to claim 7 including means to add the polyelectrolyte a short time after the addition of said sedimentating agent.

30. A system for pollution suppression according to claim 29 wherein said polyelectrolyte is an anionic polymer.

31. A system for pollution suppression according to claim 29 wherein said means to add the polyelectrolyte makes said addition from about 1½ to about 3½ minutes after the addition of said sedimentary agent.

32. A system for pollution suppression according to claim 22 which includes means to add a polyelectrolyte a short time after the addition of said sedimentating agent.

33. A system for pollution suppression according to claim 32 wherein said polyelectrolyte is added through a short tube.

34. A system for pollution suppression according to claim 33 wherein said short tube is located in a pipe downstream from said trough.

35. A system for pollution suppression according to claim 7 which includes means to add a sedimentating agent to the influent of a secondary sedimentation tank.

36. A system for pollution suppression according to claim 35 which includes means to add a polyelectrolyte resin to the influent of said secondary sedimentation tank.

37. A system for pollution suppression according to claim 36 which includes means to add a polyelectrolyte resin in said primary sedimentation tank.

38. A system for pollution suppression according to claim 35 which includes means to flocculate, complex and sediment, or complex and precipitate pollutants selected from the class consisting of oil and greases.

39. A system for pollution suppression according to claim 37 which includes means to flocculate, complex and sediment, or complex and precipitate pollutants selected from the class of oils and greases.

40. A system for pollution suppression which comprises
 a primary sedimentation tank, means to inject raw waste effluent into the tank for settling action,
 a digester, means to withdraw sludge from the primary sedimentation tank and feed it to the digester,
 a primary bioprocessing tank, means to feed the effluent from the primary sedimentation tank to the primary bioprocessing tank,
 a secondary sedimentation tank, means to deliver the effluent from the primary bioprocessing tank to the secondary sedimentation tank,
 a disinfection tank, means to add a disinfectant to the disinfection tank, and means to deliver the effluent from the secondary sedimentation tank to the disinfection tank and discharging fully processed effluent therefrom, first injection means for selectively injecting a fluid under high momentum exchange conditions into the effluent at any point in the pollution suppression system prior to said disinfection tank and means to selectively inject an oxygen containing gas into the inlet of said primary sedimentation tank.

41. A system for pollution suppression which comprises
a primary sedimentation tank, means to inject raw waste effluent into the tank for settling action,
a digester, means to withdraw sludge from the primary sedimentation tank and feed it to the digester,
a primary bioprocessing tank, means to feed the effluent from the primary sedimentation tank to the primary bioprocessing tank,
a secondary sedimentation tank, means to deliver the effluent from the primary bioprocessing tank to the secondary sedimentation tank,
a disinfection tank, means to add a disinfectant to the disinfection tank, and means to deliver the effluent from the secondary sedimentation tank to the disinfection tank and discharging fully processed effluent therefrom, first injection means for selectively injecting a fluid under high momentum exchange conditions into the effluent at any point in the pollution suppression system prior to said disinfection tank, and said means for injecting fluid having a short tube.

42. A system for pollution suppression according to claim 41 wherein said short tube is a sudden contraction within the system flow.

43. A system for pollution suppression according to claim 42 wherein said sudden contraction occurs at a transition from a large conduit to a smaller conduit.

44. A system for pollution suppression according to claim 42 wherein the length of said short tube is equal to at least several diameters of the entrance.

45. A system for pollution suppression according to claim 44 wherein a small injection mixing tube 153 extends coaxially into said short tube.

46. A system for pollution suppression according to claim 45 wherein said small injection tube is located approximately ½ to ½ diameters from the entrance of said short tube.

* * * * *

UNITED STATES PATENT OFFICE
CERTIFICATE OF CORRECTION

Patent No. 3,853,764              Dated December 10, 1974

Inventor(s) Edward T. Armstrong

It is certified that error appears in the above-identified patent and that said Letters Patent are hereby corrected as shown below:

Page 1 of the patent document, item [56], line 1, "Havorson" should be --Halvorson--.

Page 1 of the patent document, item [57], line 4, "or" should be --of--; line 13, after "while" insert --in--; line 20, "reliably" should be --reliable--.

Column 1, line 14, "effluient" should be --effluent--; line 19, "practive" should be --practice--; line 36, "of" should be --or--.

Column 2, line 19, change "liquid liquid" to --liquid-liquid--; line 45, "methanosarcma" should be --methanosarcina--; line 55, "an" should be --to--.

Column 3, line 4, "anaerobic" should be --anaerobe--; line 11, "including" should be --indicating--.

Column 5, line 24, "$19^{-9}$" should be --$10^{-9}$--; line 37, "upgrade" should be --degrade--; line 56, "the" should be --by--; line 65, delete "or".

Column 6, line 22, "includes" should be --induces--; line 26, "impored" should be --imposed; line 57, "collection" should be --collector--.

Column 7, line 33, "af-" should be --ef---; line 65, "diffusers" should be --diffuser--.

Column 8, line 21, after "one" insert --knowledgable--; line 31, "analomy" should be --anomaly--.

Page 2

UNITED STATES PATENT OFFICE
CERTIFICATE OF CORRECTION

Patent No. 3,853,764  Dated December 10, 1974

Inventor(s) Edward T. Armstrong

It is certified that error appears in the above-identified patent and that said Letters Patent are hereby corrected as shown below:

Column 9, line 15, after "containing" insert --an--; line 24, "filteration" should be --filtration--; line 28, "probelm" should be --problem--; line 32, "flow recirculation" should be --recirculation flow--; line 51, "deep. In" should be --deep, in--.

Column 10, line 16, "if" should be --is--; line 20, delete "of"; line 21, delete "of"; line 26, "P" should be --$\rho$--; line 30, "sufficies" should be --suffices--; line 39, after "calculated" insert --parameters--; line 41, "sembledd" should be --sembled--; line 58, "18 inches" should be --8 feet--; line 61, "or" should be --on--.

Column 11, line 14, "enables" should be --enable--; line 47, "ranges" should be --areas--; line 60, "liqluid" should be --liquid--.

Column 12, line 15,16, delete "digestion" and insert --recirculation--; line 17, delete "safe" and insert --treatable--; line 22, delete "be"; line 23, "propriate" should be --propriately--; also line 23, after "propriate" (changed to --propriately--) insert --be--.

Column 13, line 22, delete "as"; line 38, after "recirculation" insert --,--; line 67, change "of" to --at--.

Column 14, line 29, delete ","; line 35, after "then" insert --a--.

Column 16, line 31, change "tridkling" to --trickling--.

Column 17, line 19, "Q=b/a q c dt" should be --$Q=\int_b^a q \cdot c \cdot dt$--.

UNITED STATES PATENT OFFICE
CERTIFICATE OF CORRECTION

Patent No. 3,853,764            Dated December 10, 1974

Inventor(s)    Edward T. Armstrong

It is certified that error appears in the above-identified patent and that said Letters Patent are hereby corrected as shown below:

Column 18, line 53, "qualities" should be --quantities--.

Column 19, line 48, delete "Other" and change "techniques" to --Techniques--; line 50, "invole" should be --involve--; line 58, "if" should be --is--; line 59, "for" should be --from--; line 61, after "jected" insert --(than from air)--.

Column 20, line 25, "20" should be --30--; line 36, "main" should be --mains--; line 46, "main" should be --mains--; line 56, "main" should be --mains--.

Column 21, line 3, "saturation" should be --concentration--; line 4, "constrast" should be --contrast--; line 7, "1.0" should be --6.0--.

Column 22, line 29, "1" should be --0.1--; line 38, "if" should be --is--; line 57, after "liquid" insert --after a pump--; line 58, "knock" should be --hammer--; line 64, after "demand" insert --, or NOD,--; line 65, after "duction" insert --.-- and delete "or NOD.--; line 67, delete "a" and change "nitrifica-" to --de-nitrifica---.

Column 23, line 15, change "use" to --used--; line 28, delete "gravities load" and insert --atmospheres pressure--; line 34, change "pressure" to --pressurized--; line 47, "over treat" should be --overtreat--, and "relating" should be --relatively--; line 49, "capiital" should be --capital--; line 52, delete "It is the" and insert --With this--; line 53, after "trols" insert --,-- and delete "and" and after "regulation" insert --suffices only--; line 58, after "level" insert --in influent--.

UNITED STATES PATENT OFFICE
CERTIFICATE OF CORRECTION

Patent No. 3,853,764           Dated December 10, 1974

Inventor(s) Edward T. Armstrong

It is certified that error appears in the above-identified patent and that said Letters Patent are hereby corrected as shown below:

Column 24, line 45, "soluability" should be --solubility--; line 49, change "a" to --an-- and change "reversal effluent flow path" to --effluent flow path reversal--; line 55, after "means" insert --for--.

Column 26, line 21, "sedimentary" should be --sedimentating--.

Column 28, line 22, "1/2 to 1/2" should be --1/4 to 1/2--.

Signed and sealed this 3rd day of June 1975.

(SEAL)
Attest:

RUTH C. MASON
Attesting Officer

C. MARSHALL DANN
Commissioner of Patents
and Trademarks